United States Patent [19]

Schulz

[11] 3,820,156

[45] June 25, 1974

[54] METHOD AND ARRANGEMENT FOR AUTOMATIC PHASE AND AMPLITUDE CONTROL IN A VECTORSCOPE

[75] Inventor: Axel Schulz, Darmstadt, Germany

[73] Assignee: Robert Bosch Fernsehanlagen GmbH, Darmstadt, Germany

[22] Filed: Mar. 28, 1973

[21] Appl. No.: 345,786

[30] Foreign Application Priority Data

Jan. 14, 1972 Germany............................ 2200202

[52] U.S. Cl.......................... 358/10, 178/DIG. 4

[51] Int. Cl............................................. H04n 9/02

[58] Field of Search............ 178/5.4 TE, 5.4 R, 7.7, 178/DIG. 4, 5.2 A, 7.5 R; 324/83 FE, 121 R, 130, 88

[56] References Cited

UNITED STATES PATENTS

| | | | |
|---|---|---|---|
| 2,885,470 | 5/1959 | Bartelink | 178/DIG. 4 |
| 3,614,304 | 10/1971 | Schonfelder | 178/5.4 |

*Primary Examiner*—Richard Murray
*Assistant Examiner*—R. John Godfrey
*Attorney, Agent, or Firm*—Michael S. Striker

[57] ABSTRACT

A switch automatically connects a circular test signal to the input of the bandpass amplifier in the vectorscope during the horizontal flyback time of the composite television signal whose color signals are to be displayed on the vectorscope. The combined signal is fed through the standard vectorscope stages to the demodulator output at which are furnished the B-Y and R-Y signals. Also connected to each of the demodulator outputs is a switch operated in synchronism with the switch inserting the circular test signal into the composite television signal. The output of the switch connected to the R-Y demodulator is fed through a 90° phase shift stage and then serves to synchronize a first oscillator. The output of the second switch synchronizes a second oscillator and the two oscillator outputs are fed into a phase comparator stage whose output in turn controls the phase shift in the demodulator. Amplitude comparison of the phase shifted signal and the signal at the output of the second switch connected to the B-Y output of the demodulator results in a first control signal which varies the gain of the amplifier amplifying the chrominance signal from which the B-Y signal will be derived.

9 Claims, 2 Drawing Figures

METHOD AND ARRANGEMENT FOR AUTOMATIC PHASE AND AMPLITUDE CONTROL IN A VECTORSCOPE

BACKGROUND OF THE INVENTION

The present invention relates to a method and arrangement for automatic phase and amplitude control in a vectorscope by use of a circular test signal applied through an electronic switch to said vectorscope.

As is well known, color television signals comprise quadrature-modulated color carriers which have a phase varying as a function of the hue and an amplitude depending upon the color saturation. Further, a color synchronizing signal, also known as a color burst, is required for later demodulation. It is often desired that this color information in the color television signal be pictured as vectors on a vectorscope. It is of course essential that the X and Y amplifiers, leading to the X and Y deflection plates respectively have the same gain and that the phase shift is exactly maintained. Thus, in conventional equipment, the vectorscope is generally calibrated with a test circle prior to any measurement.

In a known method and arrangement, sinusoidal waves which have a frequency close to the frequency of the chrominance subcarrier are applied to the input of the vectorscope instead of the composite television signal prior to a measurement. The circle thus formed on the oscillograph is adjusted by hand to have the correct diameter, that is the correct amplification, and for exact circularity, that is for equal amplification in the X and Y channels as well as for a 90° phase shift between the X and Y deflection plates. Only after this calibration process has been completed is the composite television signal applied to the input of the vectorscope in order that the measurements be carried out.

In another known method and arrangement, the test circle is pictured on the oscillograph during the measurement of the composite television signal. For this purpose a vectorscope having two inputs is required, the signal at the two inputs being alternately applied to the first amplifier stage by means of an electronic switch. Here too the circle must be adjusted by hand.

The first of the above-mentioned methods has the disadvantage that one cannot be certain that the adjustments previously made have been maintained during the measurement. The second method has the disadvantage that, besides the vectors which are the desired result, the circular test signal is pictured on the vectorscope and this can be found very disturbing. Both methods have the disadvantage that the amplification in the X and Y channels and the 90° phase shift must be adjusted by hand. This is not a simple process and can actually only be carried out with a circular mask.

SUMMARY OF THE INVENTION

It is the object of the present invention to furnish a method for automatically making the adjustments in the relative gain of the X and Y channels and the phase shift therebetween.

The present invention relates to a vectorscope having an input, X and Y deflection plates, X and Y amplifier means, demodulator means and switch means for alternately connecting a composite television signal having blanked flyback intervals and a circular test signal to said input. It comprises means for applying said circular test signal to said input through said switch means during said blanked flyback intervals. Means for deriving a first and second test signal from the output of said demodulator means are also provided, as are first comparator means for comparing the amplitudes of said first and second test signals and furnishing a first control signal corresponding to the difference therebetween. Further comprised in the present invention are second comparator means for comparing the phase of said first test signal to the phase of said second test signal and furnishing a second control signal varying as a function of the difference therebetween. The invention finally comprises means connecting the output of said first and second comparator means to said amplifier and demodulator means, respectively, in such a manner that said gain of said amplifier means and said phase of said demodulator varies in dependence upon said first and second control signals respectively.

More specifically, since the phase between the X and Y deflection plates is to be 90°, the second control signal varies in correspondence to differences between the phases of the first and second test signal which exceed or are less than 90°.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
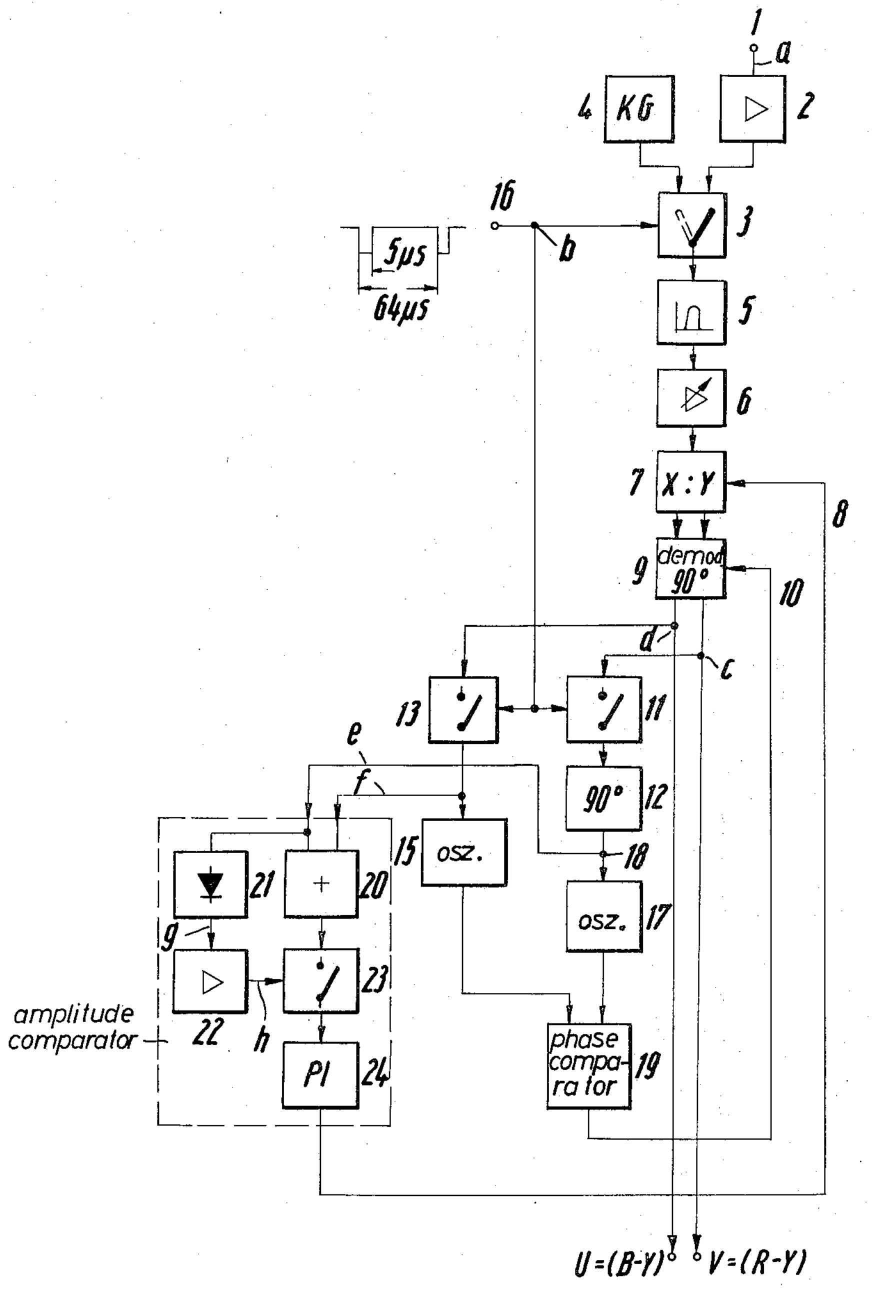
FIG. 1 is a block diagram showing the system and illustrating the method of the present invention.

A preferred embodiment of the present invention will now be described with reference to the drawing.

A composite television signal is applied at vectorscope terminal 1 through an amplifier 2 to one terminal of an electronic switch 3 which is a selector switch. In the first position, namely the position shown in the Figure, switch 3 connects the output of amplifier 2 to the input of a bandpass amplifier 5. In the second selector position, as indicated by dotted lines in FIG. 1, switch 3 connects the output of a circular test signal generator 4 to the input of bandpass amplifier 5. The circuit test signal generator 4 is a quartz controlled oscillator. Its frequency of 4.42969MHz is close to the chrominance subcarrier frequency of 4.43361875MHz. An electronic switch is so controlled that it connects the output of oscillator 4 to the input of bandpass amplifier 5 during an approximately 5 microseconds, interval which corresponds to the horizontal flyback interval of the composite television signal. For the remainder of the time the composite color television signal is connected to the input of the bandpass amplifier 5. In amplifier 5 the chrominance signal is separated from the luminance signal and the chrominance signal is applied to a chrominance control stage 6. In stage 7, whose input is connected to the output of stage 6, the chrominance signal is divided into two signals, one for yielding the B-Y signal after demodulation and the other for yielding the R-Y signal after demodulation. Stage 7 in the main comprises two low impedance output stages, one of which has a variable gain, while the other has a fixed gain. The control signal 8 whose derivation will be explained further, is applied to the stage having the variable gain in order that the gain of these two stages be the same. The output of stage 7 are thus two chrominance signals, each of which is applied to a separate demodulator stage. The two stages together are shown as stage 9 in the Figure. Since the signals present at the inputs of stage 9 are suppressed carrier signals, the relevant carriers must be added in stage 9. The carriers for the two chrominance signals are identical, except that one is phase shifted by 90° with respect to the other. Thus the output of the local oscillator must be phase shifted by 90° for application to one of the chrominance signals. This is accomplished by a regulatable phase shift circuit which in the main, comprises a coil and two capacity diodes. A voltage which is applied to the capacity diodes causes a variation in the capacitance and thus a variation in the phase shift. The circuits are in themselves known, and it is just the application of a control voltage, namely the second control voltage, derived as per the present invention wherein the present invention resides. It should simply be kept in mind that the signal 10, whose derivation will be explained in detail below, causes a variation in the phase shift of one of the carriers in such a manner that the two carriers are phase shifted by exactly 90° with respect to one another. Stages 3, 5, 6, 7 and 9 are standard vectorscope stages. They may be found in instruction manuals for such vectorscopes, for example, in the Tektronix Manual for vectorscope 521/R521 on pages 3/3 FIG. 3/2 and in the block diagrams *a* and *c.*

Connected to the outputs, labelled *c* and *d* of the two demodulator stages 9, are additional switch means 11 and 13. As indicated by the line connecting the operating input of switches 11 and 13 to point *b* which is the point at which the operating signal for switch 3 is applied, the switches are operated in synchronism with switch 3. The output at switch 11 is phase shifted by 90° in a phase shifter 12. The output, labelled 18, of phase shifter 12 controls the phase of an oscillator 17. Connected to the output of switch 13 is an oscillator 15. The outputs of oscillator 17 and 15 are connected to the inputs of phase comparator means 19, whose output furnishes the second control signal, namely a signal on line 10 which controls the phase of one of the locally oscillated subcarriers furnished in stage 9. Further, the signal at the above-mentioned point 18 and the signal at the output side of switch 13, (labelled *e* and *f,* respectively) are applied to the input of adder means 20. The signal from point 18 is further applied to rectifier means whose output is designated by *g*. The so-rectified signal, after amplification in an amplifier 22, is used to control a switch 23 which, when closed, connects the output of the adder means 20 to the input of a proportional integrator 24. The proportional integrator 24 may be a RC network which furnishes an output signal which is proportional to the integral of the signal applied at the integrator input. The signal furnished by the integrator 24 is the signal on line 8 which is used to control the relative gain of the amplifiers in stage 7, that is it adjusts the gain of one of the amplifiers to match the gain of the other.

In accordance with the present invention, oscillator 17 oscillates with a frequency of 4.43361875MHz–4.42969MHz is equal to 0.00392875MHz, that is a frequency which is equal to the difference in frequency between the chrominance subcarrier and the signal furnished by the circular test signal generator. This oscillator, as well as oscillator 15 which operates at the same frequency therefore have the same frequency as the signal derived from the output of demodulator stages 9 during the time that switches 11 and 13 are closed. Oscillator 17 is, as mentioned above, synchronized with the signal on line *c* after a 90° phase shift, while oscillator 15 is synchronized directly with the signal appearing on line *d*. These signals at the outputs of oscillator 17 and 15 are thus 180° out of phase if the signals on line *c* and *d* are, as is proper, 90° out of phase. The signal furnished at the output of phase comparator 19 exists only when the signal at its inputs have a phase differences exceeding or less than 180°. This signal, namely the second control signal, then adjusts the phase of one of the chrominance subcarrier signals locally generated with respect to the other.

The signals at the input of adder means 20 are of course also 180° out of phase and thus the adder only furnishes an output when a difference in amplitude between the signals on lines *c* and *d* exists during the above-mentioned 5 microsecond period which corresponds to the horizontal flyback period of the composite television signal. As mentioned above the signal on line *e* is also applied to a rectifier 21. The output of rectifier 21 furnishes only the positive pulses of the R-Y signal after a phase shift of 90°. These pulses are applied to a pulse former stage 22 to serve as pulses for activating switch 23. As mentioned above, the electronic switch 23 connects the output of the adder means to the input of the proportional integrator means 24 when closed. The output of proportional integrator 24, as mentioned above, is the first control signal which, applied through line 8 to one of the stages in stage 7 varies the gain thereof in such a manner that the stages have the same gain.

Figure 2:
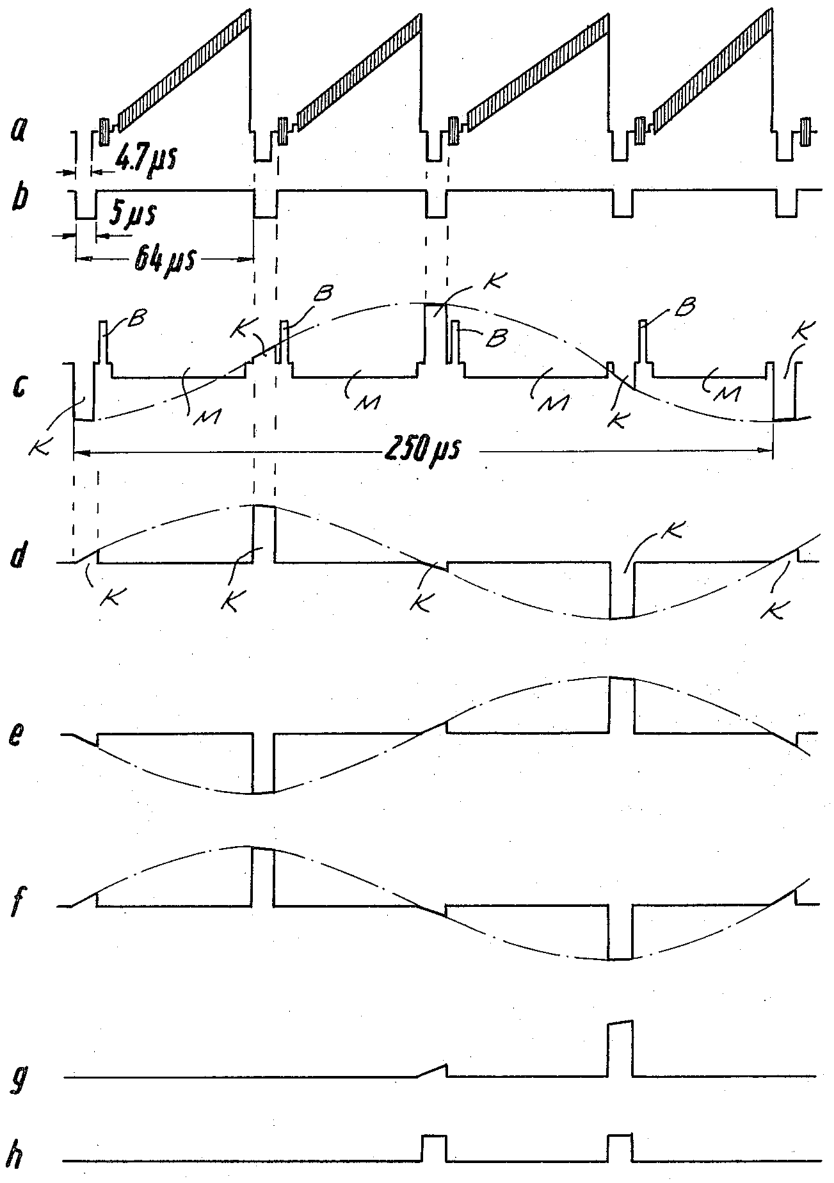
FIG. 2 is a voltage-time diagram showing wave forms at predetermined points of the block diagram of FIG. 1.

The waveforms at various points in the circuit will now be described with reference to FIG. 2. Line *a* in FIG. 2 shows five lines of the composite television signal. It will be noted that the horizontal flyback time is a 4.7 microsecond interval. The period of one line is 64 microseconds. The switching pulses for operating switch 3, namely the signals applied on line *b* are shown in line *b* of FIG. 2. It will be noted that these are 5 microsecond pulses reoccurring at 64 microsecond intervals. The signal on line *b* of course also operates switches 11 and 13. The pulses in line *b* include the trailing edge of the horizontal synchronizing pulses shown in line *a*. Lines *c* and *d* show the output signals at the output of the demodulator stages 9. The pulses labelled K, namely the pulses which coincide with the 5 microsecond interval shown as the interval wherein the switches are operated in line *b*, correspond to the demodulated circular test signal. The pulses labelled B in line *c* are the pulses resulting from the demodulation of the color burst in the composite television signal of line *a*. If the chrominance signal, which is modulated onto the sawtooth signal shown in line *a*, is demodulated, the pulses M of line *c* result.

Pulses B and M are still present in the signal shown in line *d*, but, because of the addition of the chrominance subcarrier signal in the demodulator stage 9, for the B-Y signal, the amplitude of pulses B and M has been decreased so that they are no longer visible in line *d*.

If the signal at the output of the circular test signal generator were applied during the whole time period instead of only during the 5 microsecond interval, the output of the R-Y demodulator which show a negative cosine function, while the output of the B-Y demodulator would show a sine function. These are indicated in dashed lines in lines *c* and *d*. However, since the circular test signals are applied only during the 5 microsecond interval, the pulses K result. The amplitude of the pulses corresponds to the corresponding amplitude of the negative cosine and the sine. The period of the above-mentioned sine and cosine oscillations is approximately 250 microseconds, that is it corresponds to the difference between the chrominance subcarrier frequency and the frequency of the circular test signal generator.

Switches 11 and 13 only allow the transmission of signals from lines *c* and *d* to the output of switches 11 and 13 during the horizontal flyback interval. Thus the signal on line *e* corresponds to the circular test signal furnished on line *c* after a phase shift of 90°, while the signal on line *f* is the corresponding signal appearing on line *d*, but without a 90° phase shift. The signal at the output of rectifier 21, namely the positive portions of the signal of line *e* is shown in line *g*. Pulse former 22 then transforms these positive signals into the signals shown on line *h*, namely pulses appropriate for the operation of switch 23.

It is seen that the present invention comprises an economical and reliable method and arrangement for automatically controlling the phase and amplitudes relationships in the X and Y channels of a vectorscope.

While the invention has been illustrated and described as embodied in a particular arrangement for deriving the first and second control signal, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. In a vectorscope having an input, X and Y deflection plates, X and Y amplifier means, demodulator means and switch means for alternately connecting a composite television signal having blanked flyback intervals and a circular test signal to said input, a method for automatically controlling the phase of said demodulator means and the amplification of said amplifier means, comprising, in combination, the steps of applying said circular test signal to said input through said switch means during said blanked flyback intervals; deriving a first and second test signal from the output of said demodulator means; comparing the amplitude and phase of said second test signal to the amplitude and phase of said first test signal and furnishing a first and second control signal corresponding, respectively, to the differences in amplitude and in phase of said first and second test signal; and controlling said amplification and said phase in dependence, respectively, upon said first and second control signal.

2. A method as set forth in claim 1, wherein said blanked flyback intervals are the horizontal flyback intervals of said composite television signal.

3. In a vectorscope having an input, X and Y deflection plates, X and Y amplifier means, demodulator means and switch means for alternately connecting a composite television signal having blanked flyback intervals and a circular test signal to said input, a system for automatically controlling the phase of said demodulator means and the gain of said amplifier means, comprising, in combination, means operating said switch means in such a manner that said circular test signal is applied to said input during said blanked flyback intervals of said composite television signal; means for deriving a first and second test signal from the output of said demodulator means; first comparing means for comparing the amplitude of said first test signal to the amplitude of said second test signal and furnishing a first control signal corresponding to the difference therebetween; second comparing means for comparing the phase of said second test signal to the phase of said first test signal and furnishing a second control signal as a function of the difference therebetween; and means applying said first and second control signals to said amplifier and demodulator means respectively, in such a manner that the phase of said demodulator means and the gain of said amplifier means are controlled thereby.

4. An arrangement as set forth in claim 3, wherein said means for operating said switch means comprise means for operating said switch means in such a manner that said circular test signal is applied to said input of said vectorscope during the horizontal flyback intervals of said composite television signal.

5. An arrangement as set forth in claim 4, wherein said demodulator means comprise first and second demodulator means for furnishing, respectively, the R-Y and the B-Y signals to said X and Y deflection plates of said vectorscope; and wherein said means for deriving said first and second test signals comprise first and second additional switch means connected, respectively, to the output of said first and second demodulator means and operated in synchronism with said switch means of said vectorscope.

6. An arrangement as set forth in claim 5, wherein said second comparator means comprise 90° phase shift means connected to said first switch means, for furnishing a phase shifted first test signal; first oscillator means connected to the output of said 90° phase shift means for furnishing a first oscillator signal synchronized to said phase-shifted first test signal; second oscillator means connected to said second switch means for furnishing a second oscillator signal synchronized with said second test signal, and phase comparator means having a first input connected to the output of said first oscillator means, a second input connected to the output of said second oscillator means and an output for furnishing said second control signal.

7. An arrangement as set forth in claim 6, further comprising means for connecting said output of said phase comparator means to said demodulator means in such a manner that the phase shift in said demodulator means varies as a function of said second control signal.

8. An arrangement as set forth in claim 5, further comprising phase shift means connected to said first additional switch means for phase shifting said first test signal an angle of 90°, thereby creating a phase shifted first test signal; and wherein said first comparator means comprise adder means having a first and second input for, respectively, receiving said phase shifted first test signal and said second test signal, and an adder output, rectifier means for rectifier said phase shifted first test signal, thereby furnishing a rectified signal; integrator circuit means having an integrator input and an integrator output for furnishing said first control signal as a function of the integral of a signal applied at said integrator input, and comparator switch means operative under control of said rectified signal, for connecting said adder output to said integrator input.

9. An arrangement as set forth in claim 8, further comprising first and second amplifier means having, respectively, a first and second output connected to the input of said first and second demodulator means; and means interconnecting the output of said integrator means to said second amplifier means in such a manner that the amplification of said second amplifier means varies as a function of said first control signal.

* * * * *